United States Patent
Sun et al.

(10) Patent No.: US 11,514,003 B2
(45) Date of Patent: Nov. 29, 2022

(54) DATA COMPRESSION BASED ON KEY-VALUE STORE

(71) Applicant: ALIPAY (HANGZHOU) INFORMATION TECHNOLOGY CO., LTD., Zhejiang (CN)

(72) Inventors: Qiming Sun, Hangzhou (CN); Zhitao Shen, Hangzhou (CN); Wei Jia, Hangzhou (CN); Wen Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/361,096

(22) Filed: Jun. 28, 2021

(65) Prior Publication Data
US 2022/0019562 A1   Jan. 20, 2022

(30) Foreign Application Priority Data
Jul. 17, 2020   (CN) .......................... 202010693451.3

(51) Int. Cl.
G06F 16/21   (2019.01)
G06F 16/23   (2019.01)

(52) U.S. Cl.
CPC .......... *G06F 16/21* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 9,973,597 B1* | 5/2018 | Karppanen | H04L 69/04 |
| 2003/0030575 A1* | 2/2003 | Frachtenberg | H03M 7/3088 |
| | | | 341/51 |
| 2007/0096953 A1* | 5/2007 | Odagiri | H03M 7/3084 |
| | | | 341/50 |
| 2010/0223237 A1* | 9/2010 | Mishra | G06F 9/30178 |
| | | | 707/693 |
| 2011/0055174 A1* | 3/2011 | Popovski | G06F 16/22 |
| | | | 707/693 |
| 2012/0078978 A1* | 3/2012 | Shoolman | G06F 16/289 |
| | | | 707/803 |
| 2016/0197621 A1 | 7/2016 | Hong et al. | |
| 2017/0177604 A1 | 6/2017 | Geissinger et al. | |

(Continued)

OTHER PUBLICATIONS

Zhao, Kai, et al., "Significantly Improving Lossy Compression for HPC Datasets with Second-Order Prediction and Parameter Optimization", ACM HPDC '20 , Jun. 23-26, 2020, pp. 89-100. (Year: 2020).*

(Continued)

*Primary Examiner* — Scott A. Waldron
(74) *Attorney, Agent, or Firm* — Fish & Richardson P.C.

(57) ABSTRACT

Methods, systems, and apparatus for, for data compression based on a key-value store. In one aspect, a method includes generating, at a server, a current dictionary based on a plurality of key-values stored in a storage system of the server; receiving a key-value pair transmitted by a client device; and performing, at the server, data compression on a key-value in the key-value pair by using the current dictionary; and storing the key-value in the storage system of the server.

14 Claims, 7 Drawing Sheets

(56) References Cited

U.S. PATENT DOCUMENTS

2017/0279932 A1* 9/2017 Schurman ........... G06F 16/2228
2019/0121884 A1* 4/2019 Swaminathan .... H04N 21/6336

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Application No. 21181445.4, dated Dec. 13, 2021, 10 pages.

* cited by examiner

DATA COMPRESSION BASED ON KEY-VALUE STORE

CROSS-REFERENCE TO RELATED APPLICATIONS

This application claims priority to Chinese Patent Application No. 202010693451.3, filed on Jul. 17, 2020, which is hereby incorporated by reference in its entirety.

TECHNICAL FIELD

The present specification relates to the field of storage technologies, and in particular, to data compression methods and systems based on a key-value store.

BACKGROUND

With the rapid development of computer technologies and network technologies, more and more data and information appear in people's daily lives, which need to be stored and retained. Therefore, database systems are developed. The database systems can realize sharing and centralized management of data in databases, and the centralized management includes operations such as writing, reading and modification of data. The data managed by the database system is stored in a storage system, so the space and access speed of the storage system have impact on the data management operation of the database system. When the data stored in the storage system increases continuously, the available space become smaller, and at this moment the data in the storage system needs to be compressed to release the space.

At present, key-value storage systems have been widely used. The key-value storage system is a system that stores data by using key-value pairs, wherein, key refers to a keyword, and value refers to a value corresponding to the keyword. The key-value storage system can extract a corresponding value according to a keyword. The key-value storage system usually can deliver quite high query performance on precise query due to its low time complexity during query. In the existing technology, the key-value storage system generally compresses storage data on a client device in a dictionary compression way, and transmits the compressed storage data to a server for storage. However, the client device generally generates a compression dictionary for single piece of data when performing dictionary compression on the storage data, and transmits compressed data of the single piece of data together with the dictionary used in compression to the storage system for storage. Thus, when performing dictionary compression, the client device needs to perform high-frequency word analysis on each piece of data of the client device to generate a corresponding dictionary, which increases time consumption and latency of compression, and moreover, the compression dictionary generated when each piece of data is compressed is stored in the storage system, which will require an additional storage space. In addition, a data size of the single piece of data is small, so the generated compression dictionary has only a few high-frequency words, and compression is inefficient.

Therefore, there is a need for data compression methods and systems based on a key-value store that have higher compression efficiency and can compress data on a server.

SUMMARY

The present specification provides data compression methods, systems and non-transient storage media based on a key-value store that can efficiently and automatically identify an operational risk of an operation (such as a transaction operation) currently performed by a user on a system, and disclose a class of the risk to the user.

In a first aspect, the present specification provides a data compression method based on a key-value store, including the following: a current dictionary is generated based on a plurality of key-values in a storage system of a server; a key-value pair transmitted by a client device is received; and data compression is performed on a key-value in the key-value pair by using the current dictionary and the key-value is stored in the storage system.

In some embodiments, the storage system includes a cache storage system.

In some embodiments, the step that the current dictionary is generated based on the plurality of key-values in the storage system of the server includes the following: N key-values are selected from the plurality of key-values in the storage system as training data, wherein N is an integer greater than 1; a dictionary training parameter is set, dictionary training is performed based on the dictionary training parameter and the training data to obtain a plurality of candidate dictionaries; and a dictionary with the highest compression efficiency is selected from the plurality of candidate dictionaries as the current dictionary.

In some embodiments, the step that the current dictionary is generated based on the plurality of key-values in the storage system of the server further includes the following: M key-values are selected from the plurality of key-values in the storage system as verification data, wherein M is an integer greater than 1; and the step that the candidate dictionary with the highest compression efficiency is selected from the plurality of candidate dictionaries as the current dictionary includes the following: the candidate dictionary with the highest compression efficiency is selected from the plurality of candidate dictionaries as a target dictionary; compression efficiency of the target dictionary is verified based on the verification data; and the target dictionary is used as the current dictionary.

In some embodiments, M is equal to N.

In some embodiments, the method further includes the following: it is determined that compression efficiency of the storage system decreases, and the current dictionary is updated.

In some embodiments, the step that it is determined that the compression efficiency of the storage system decreases, and the current dictionary is updated includes the following: overall compression efficiency of the current dictionary for the storage system at a current moment is calculated; it is determined that a decrease of the overall compression efficiency of the current dictionary for the storage system at the current moment relative to overall compression efficiency at a previous moment exceeds a target threshold; and the current dictionary is updated.

In some embodiments, the step that the current dictionary is updated includes the following: a candidate updated dictionary is generated based on a plurality of key-values in the storage system of the server at the current moment; the plurality of key-values in the storage system are compressed by using the candidate updated dictionary; it is determined that overall compression efficiency of the candidate dictionary for the storage system is higher than that of the current dictionary for the storage system at the current moment; and the candidate dictionary is used as the current dictionary.

In some embodiments, the step that it is determined that the compression efficiency of the storage system decreases, and the current dictionary is updated further includes the following: a compressed key-value stored in the storage system is decompressed by using a current dictionary before updating; and the key-value decompressed by the current dictionary before updating is compressed by using a current dictionary after updating to obtain an updated compressed key-value.

In some embodiments, the method further includes the following: a target key-value in the storage system is read.

In some embodiments, the step that the target key-value in the storage system is read includes the following: a reading request for the target key-value transmitted by a target client device is received, wherein the client device includes the target client device, the plurality of key-values includes the target key-value; a compressed key-value corresponding to the target key-value is decompressed by using the current dictionary to obtain the target key-value; and the target key-value is transmitted to the target client device.

In a second aspect, the present specification provides a data compression system based on a key-value store, including at least one storage medium and at least one processor, wherein the at least one storage medium includes at least one instruction set, and is configured for data compression based on a key-vale store; and the at least one processor is in communication connection with the at least one storage medium, and when the system runs, the least one processor reads the at least one instruction set, and implements, based on an indication of the at least one instruction set, the data compression method based on a key-value store according to the first aspect of the present specification.

It can be understood from the previous technical solutions that the data compression methods and systems based on a key-value store provided by the present specification can perform dictionary compression on the key-value data in the storage system on the server. Because the storage system of the server stores a large amount of key-value data, for example, the existing storage system has hundreds of millions of pieces of key-value data. The dictionary generated based on the data of the server can identify a common high-frequency character string from a large amount of data, and therefore, data compression is more efficient. In addition, because the dictionary is generated based on a large amount of data of the server, the dictionary is applicable to all data of the server, and there is no need to generate a dictionary for each piece of data. Therefore, the methods and systems provided in the present specification can increase a data compression speed to reduce a cost of the storage system. Meanwhile, the methods and systems provided by the present specification can monitor the overall data compression efficiency of the server, and automatically update the compression dictionary when the overall data compression efficiency decreases, thereby ensuring the overall data compression efficiency.

Other functions of the data compression methods and systems based on a key-value store provided by the present specification will be partially listed in the following descriptions. Based on the description, the following numerical and example descriptions will be clear to those skilled in the art. The inventive aspects of the data compression methods and systems based on a key-value store and the storage media provided by the present specification can be fully explained by practice or use of the methods, apparatuses and combinations described in the following detailed examples.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

Figure 1:
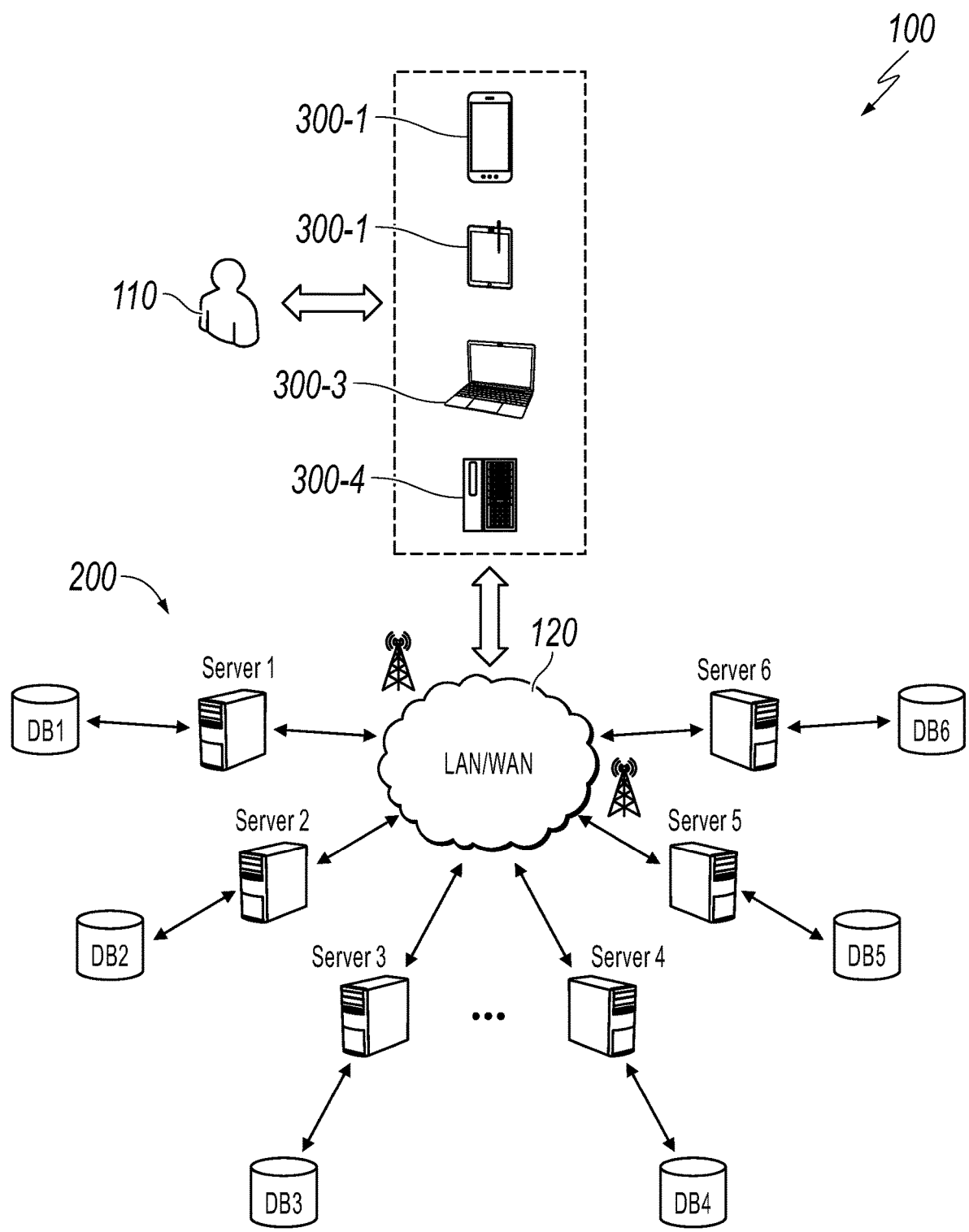
FIG. 1 is a schematic diagram illustrating an application scenario of a data compression system based on a key-value store, according to some embodiments of the present specification.

The following description provides specific application scenarios and needs of the present specification in order to enable those skilled in the art to make and use the content of the present specification. Various modifications to the disclosed embodiments will be readily clear to those skilled in the art, and the generic principles defined here can be applied to other embodiments and applications without departing from the spirit and scope of the present specification. Accordingly, the present specification is not limited to the embodiments shown, but is to be accorded the widest scope consistent with the claims.

Terms used here are merely for the purpose of describing specific example embodiments, rather than limitation. For example, unless the context clearly indicates otherwise, the singular forms "a", "an" and "the" used here can also include plural forms. When used in the present specification, the terms "include", "comprise" and/or "contain" mean that the associated integers, steps, operations, elements and/or components are present, but do not preclude the presence or addition of one or more other features, integers, steps, operations, elements, components, and/or groups in the system/method.

These features and other features, as well as operations and functions of related elements of the structure, as well as the combination of parts and the economies of manufacturing of the present specification can be significantly improved in view of the following description. Referring to the drawings, all of these form a part of the present specification. However, it should be clearly understood that the drawings are merely used for the purposes of illustration and description, rather than limitation to the scope of the present specification. It should be further understood that the drawings are not drawn according to a scale.

The flowcharts used in the present specification illustrate operations of the systems implemented according to some embodiments of the present specification. It should be clearly understood that operations of the flowchart does not have to be performed in order. Instead, operations can be performed in a reverse order or at the same time. In addition, one or more other operations can be added to the flowchart. One or more operations can be omitted from the flowchart.

In the existing technology, storage data of a key-value storage system is mostly compressed on a client device, especially for a cache storage system. Because data in the cache storage system is read more but written less, and has high mobility, compression on the client device is usually adopted for the cache storage system in the existing technology. That is, the client device compresses each piece of key-value data, and transmits the compressed data together with a compression dictionary used in compression to the cache storage system for storage, which increases an additional storage space. Overall compression efficiency of the data stored in the cache storage system is low, and the cost is high for a storage system with a large amount of data. The overall compression efficiency can be a ratio of a data size before compression to a data size after compression of all data stored in the storage system. The larger the ratio is, the higher the overall compression efficiency is; the smaller the ratio is, the lower the overall compression efficiency is. The overall compression efficiency can also be a ratio of the data size after compression to the data size before compression of all data stored in the storage system. The smaller the ratio is, the higher the overall compression efficiency is; the larger the ratio is, the lower the overall compression efficiency is. For ease of illustration, the overall compression efficiency being the ratio of the data size before compression to the data size after compression of all data stored in the storage system is taken as an example for description. Dictionary compression mainly maps repeated content in data to a corresponding character, and a size of the repeated content usually is larger or even much larger than that of the corresponding character, thereby achieving the purpose of data package compression. For example, there is certain data "AAA, BBB, CCC, AAA, BBB, CCC". Assume that in a compression dictionary, "AAA" corresponds to "X", "BBB" corresponds to "Y", and "CCC" corresponds to "Z". As such, the content of the data can be mapped to "X, Y, Z" through the compression dictionary; and the data size after compression is greatly reduced compared to that before compression. The data in the key-value storage system is untyped data, so the key-value storage system is applicable to dictionary compression, but is not suitable to coding compression.

Data compression methods and systems based on a key-value store provided by the present specification are applied to a server, and can perform dictionary compression on key-value data in a storage system on the server. Because a large amount of key-value data is stored in the storage system of the server, a dictionary generated based on the data of the server can identify a common high-frequency character string from a large amount of data; and data compression is more efficient. In addition, because the dictionary is generated based on a large amount of data of the server, the dictionary is applicable to all data of the server, and there is no need to generate a dictionary for each piece of data. Therefore, the methods and systems can improve a data compression speed to reduce a cost of the storage system.

FIG. 1 is a schematic diagram illustrating an application scenario of a data compression system 100 based on a key-value store. The system 100 can include a server 200, a client device 300 and a network 120.

The client device 300 can be an electronic device loaded with a target application (a target APP). A user 110 can be a user of the client device 300. The client device 300 can be in communication connection with the server 200. In some embodiments, the client device 300 can be installed with one or more applications (APPs). The APP can provide the target user 110 with an ability and an interface to interact with an outside world via the network 120. The target APP refers to a client device App corresponding to the server 200. In some embodiments, the client device 300 can include a mobile device 300-1, a tablet computer 300-2, a laptop 300-3, a built-in device of a motor vehicle 300-4 or similar devices, or any combination of these devices. In some embodiments, the mobile device 300-1 can include a smart home device, a smart mobile device or similar devices, or any combination of these devices. In some embodiments, the smart home device can include a smart television, a desktop, etc., or any combination of these devices. In some embodiments, the smart mobile device can include a smart phone, a personal digital assistant, etc., or any combination of these devices. In some embodiments, the client device 300 can be a device with a positioning technology for positioning the client device 300.

The server 200 can store data or an instruction for implementing data compression methods based on a key-value store described in the present specification, and can execute at least one of the data or the instruction. The client device 300 may have a permission to access the server 200, and the client device 300 can access the data or instruction stored in the server 200 via the network 120. The key-value storage system can be a memory storage system and a hard disk storage system, or can be a cache storage system. The server 200 can include a key-value storage system, and can store key-value data obtained from the client device 300. The server 200 can be responsible for operation requests such as writing, reading and deletion of all key-value data. All requests such as writing, reading and deletion of data are performed by the server 200. These requests can come from the client device 300. The server 200 can be a standalone server. Or, the server 200 can be a distributed server cluster. The distributed server cluster can include a plurality of sub-servers in distributed connection. The plurality of sub-servers can communicate with one another to exchange data and information. For example, the plurality of sub-servers can be linked together via the network 120. The plurality of sub-servers can share a common work target, and each sub-server in the plurality of sub-servers completes one or more sub-targets in the work target, and transmits an operation result of the sub-target to other sub-servers that need the sub-target. In addition to one or more processors, each sub-server can also include one or more storage media (such as a memory) to store the key-value data and other data needed to be stored when processing the sub-target. Of course, each sub-server can also share one or more storage media (such as a memory). The storage medium can be connected to each sub-server via the network 120. The data or instruction of the data compression methods based on a key-value store described in the present specification can be stored in the storage medium. The sub-server can be a general purpose computer or special purpose computer. For example, the sub-server can be a server, a personal computer, a portable computer (such as a laptop and a tablet computer), or can be another electronic device have a computing capability.

The network 120 can promote an exchange of at least one of information or data. As shown in FIG. 1, the client device 300 and the server 200 can be connected with the network 120, and exchange at least one of information or data with each other via the network 120. For example, the server 200 can obtain a key-value pair from the client device 300 via the network 120. In some embodiments, the network 120 can be any type of wired or wireless networks, and can also be a combination of these networks. For example, the network 120 can include a cable network, a wired network, an optical network, a telecommunication network, an intranet, an internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network or a similar network. In some embodiments, the network 120 can include one or more network access points. For example, the network 120 can include a wired or wireless network access point, and one or more components of the client device 300 and the server 200 can be connected to the network 120 to exchange at least one of data or information.

As shown in FIG. 1, the user 110 performs an operation request such as writing, reading and deletion of data for a key-value on the client device 300; the operation request is transmitted to the server 200 via the network 120; the server 200 executes the instruction of the data compression methods based on a key-value store according to the present specification, and compresses and stores the written data, or decompress and outputs the read data.

Figure 2:
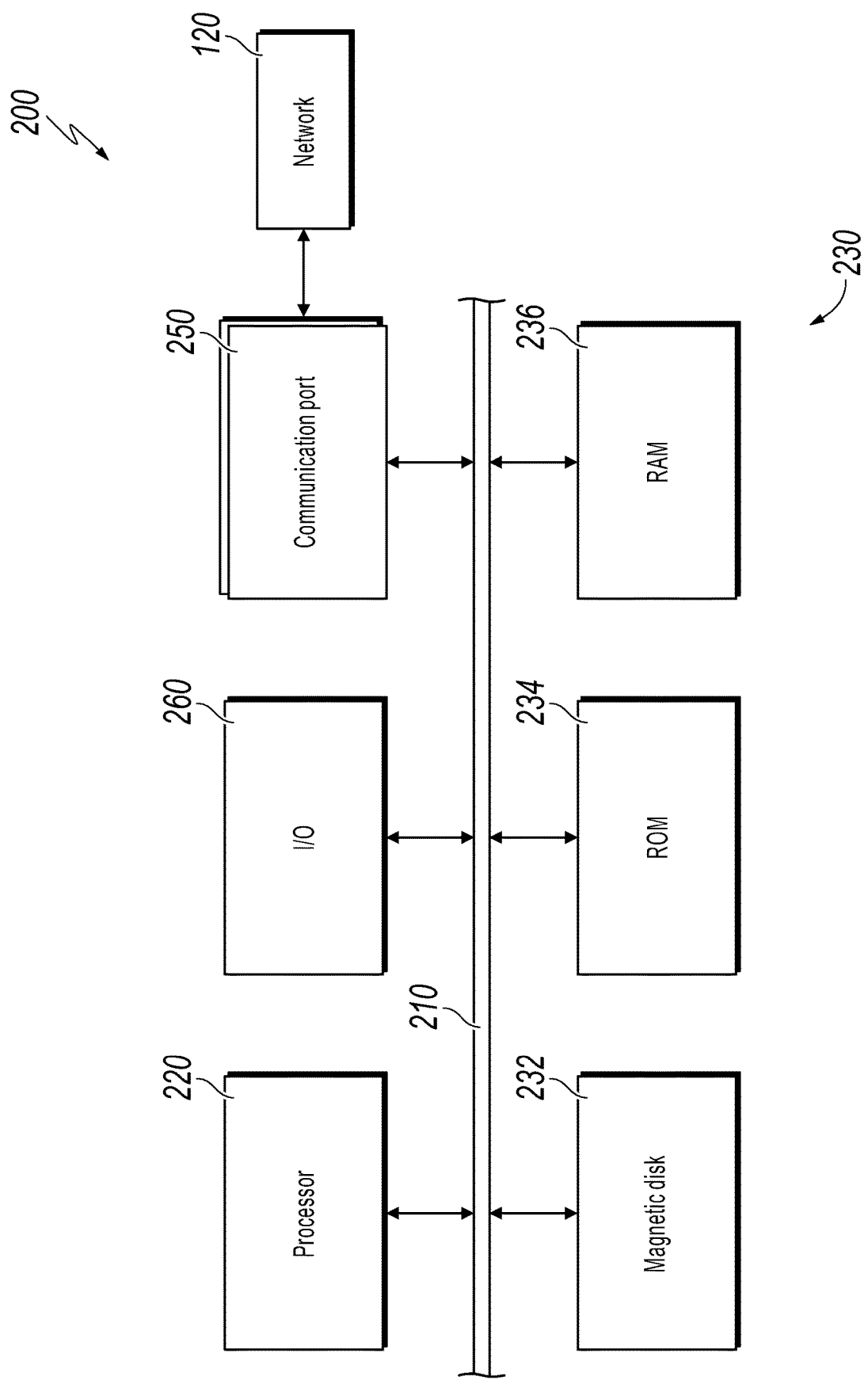
FIG. 2 is a schematic diagram illustrating a data compression device based on a key-value store, according to some embodiments of the present specification.

FIG. 2 is a schematic diagram illustrating a data compression device based on a key-value store. The device can be the server 200, the sub-server or the client device 300. The device will be explained in the following description taking the server 200 as an example.

Figure 3:
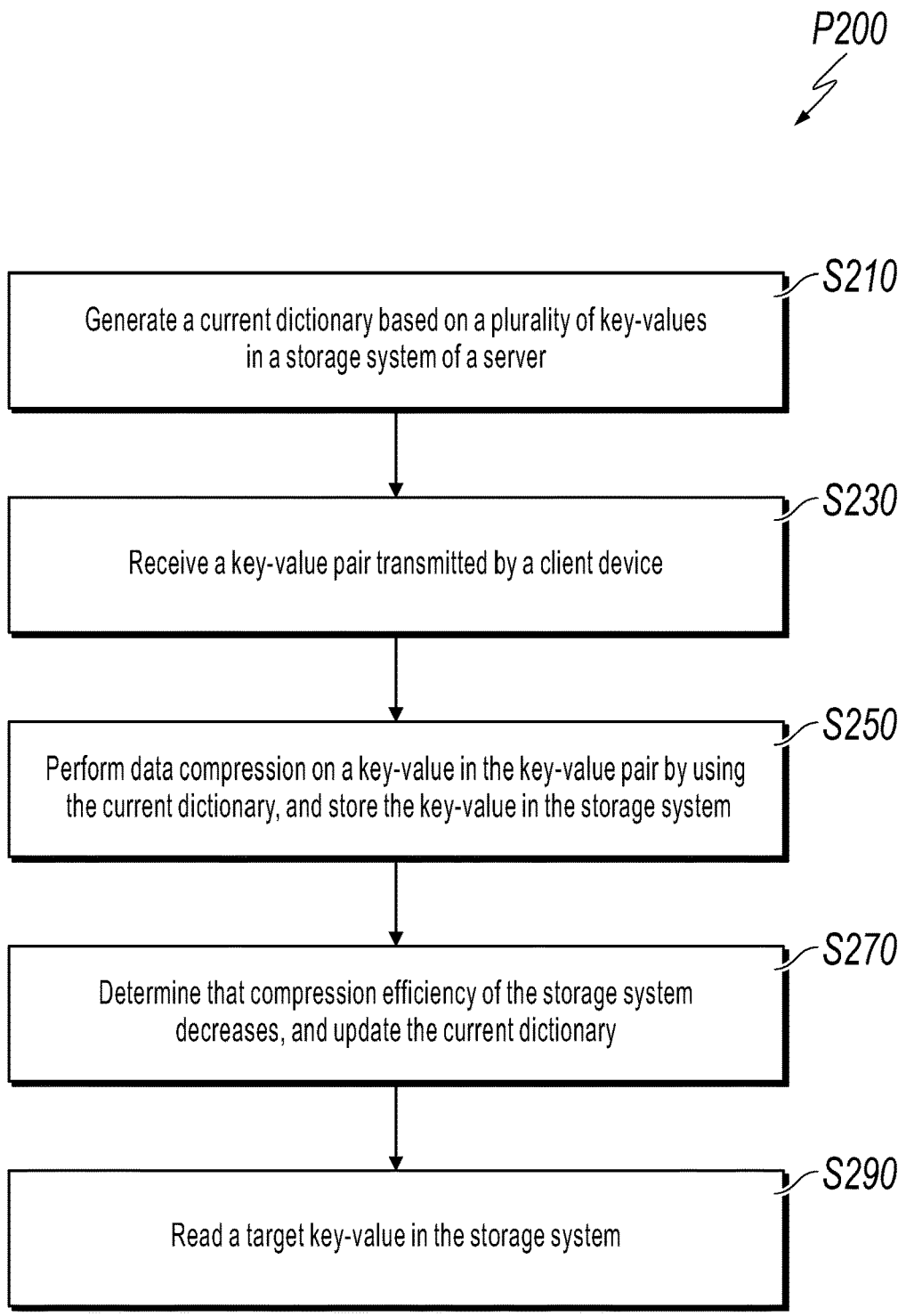
FIG. 3 is a flowchart illustrating a data compression method based on a key-value store, according to some embodiments of the present specification.
Figure 7:
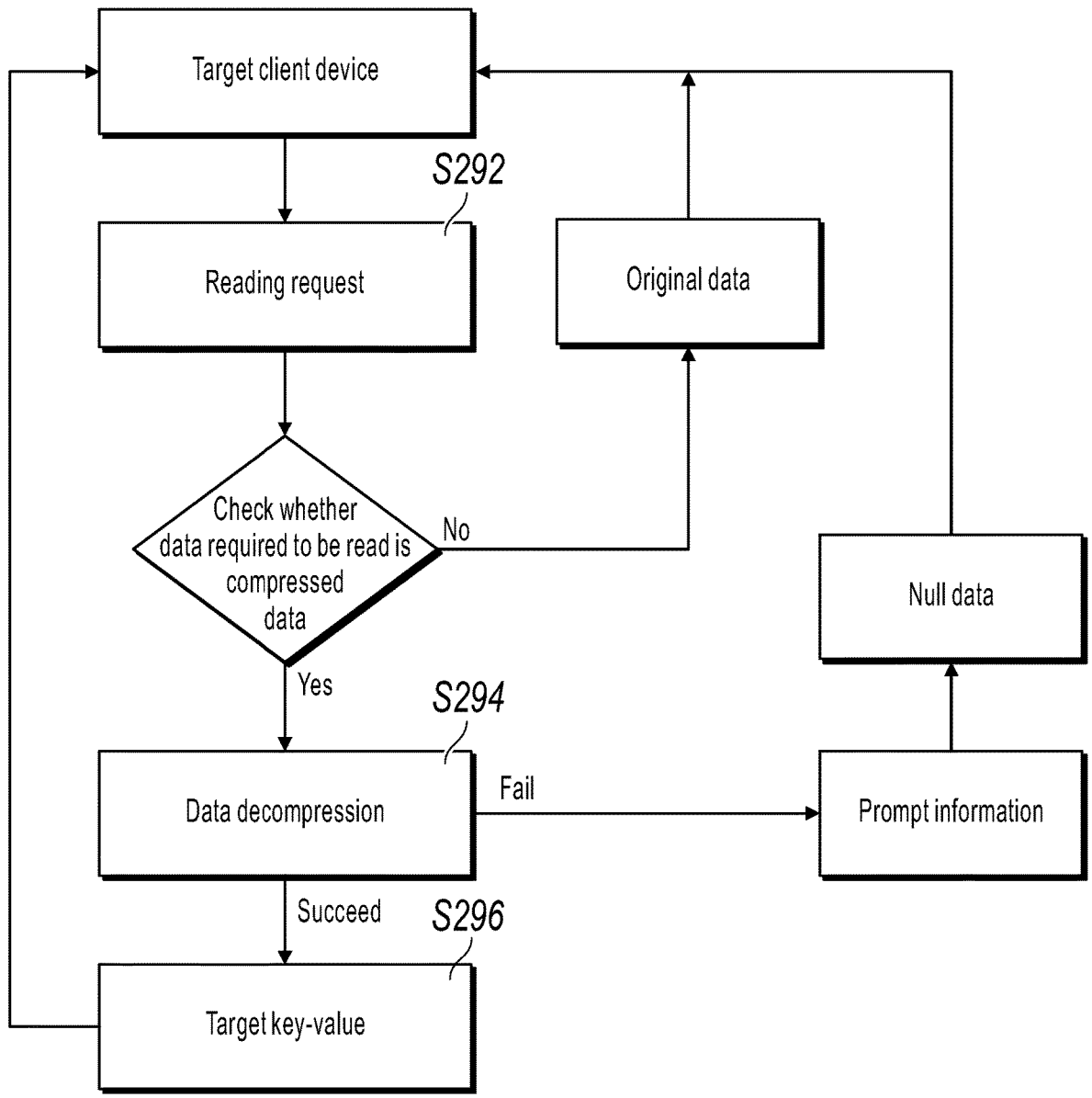
FIG. 7 is a flowchart illustrating data reading, according to some embodiments of the present specification.

The server 200 can implement the data compression methods based on a key-value store described in the present specification. The data compression methods based on a key-value store are illustrated in other parts of the present specification. For example, the data compression methods P200 based on a key-value store are illustrated in the descriptions of FIG. 3 and FIG. 7.

As shown in FIG. 2, the server 200 includes at least one storage medium 230 and at least one processor 220. In some embodiments, the server 200 can further include a communication port 250 and an internal communication bus 210. Meanwhile, the server 200 can further include an I/O component 260.

The internal communication bus 210 can connect different system components, including the storage medium 230 and the processor 220.

The I/O component 260 supports input/output between the server 200 and other components.

The storage medium 230 can include a data storage apparatus. The data storage apparatus can be a non-transient storage medium, or can be a transitory storage medium. For example, the data storage apparatus can include one or more of a magnetic disk 232, a read-only memory (ROM) 234 or a random access memory (RAM) 236. The storage medium 230 can further include at least one instruction set stored in the data storage apparatus. The instruction is a computer program code that can include a program, a routine, an object, a component, a data structure, a process, a module, etc. that implements the data compression methods based on a key-value store provided by the present specification.

The communication port 250 is configured for data communication between the server 200 and the outside world. For example, the server 200 can be connected with the network 120 via the communication port 250.

The at least one processor 220 is in communication connection with the at least one storage medium 230 via the internal communication bus 210. The at least one processor 220 is configured to execute the at least one instruction set. When the system 100 runs, the at least one processor 220 reads the at least one instruction set, and performs, based on an indication of the at least one instruction set, a data compression method P200 based on a key-value store provided by the present specification. The processor 220 can perform all steps included in the data compression method P200 based on a key-value store. The processor 220 can be in the form of one or more processors, and in some embodiments, the processor 220 can include one or more hardware processors, such as a microcontroller, a microprocessor, a reduced instruction set computer (RISC), an application-specific integrated circuit (ASIC), an application-specific instruction set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), and a programmable logic device (PLD), any circuit or processor that can perform one or more functions, etc., or any combination of these processors. For illustrative purposes only, only one processor 220 is described in the server 200 in the present specification. However, it is worthwhile to note that the server 200 in the present specification can further include a plurality of processors, so at least one of an operation or a method step disclosed in the present specification can be implemented by one processor as described in the present specification, or can be implemented jointly by a combination of the plurality of processors. For example, if the processor 220 of the server 200 performs step A and step B in the present specification, it should be understood that step A and step B can also be jointly or separately performed by two different processors 220 (for example, a first processor performs step A, and a second processor performs step B, or the first and second processors jointly perform steps A and B).

Although the previously described structure describes the server 200, this structure is also applicable to the client device 300.

FIG. 3 is a flowchart illustrating a data compression method P200 based on a key-value store. As previously described, the method P200 is applied to the server 200 for compressing and storing the key-value data in the storage system of the server 200. The storage system can be a memory storage system and a hard disk storage system, or can be a cache storage system. The server 200 can implement the data compression method P200 based on a key-value store provided by the present specification. Specifically, the processor 220 in the server 200 can read an instruction set stored in at least one of its local storage medium or the server 200, and performs, based on the stipulation of the instruction set, the data compression method P200 based on a key-value store provided by present specification. The method P200 can include the following steps performed by the at least one processor 220:

S210: a current dictionary is generated based on a plurality of key-values in the storage system of the server 200.

Figure 4:
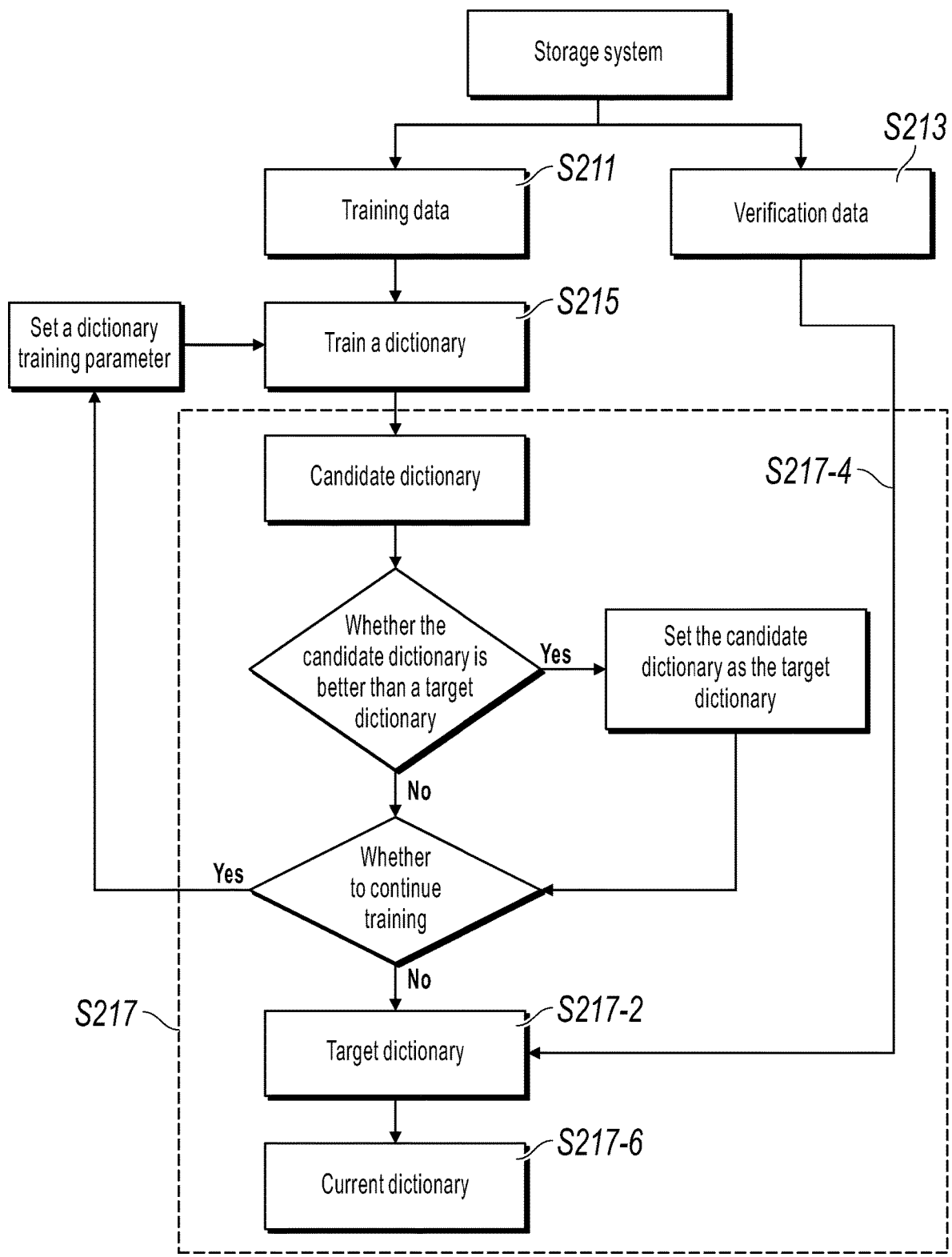
FIG. 4 is a flowchart illustrating generation of a current dictionary, according to some embodiments of the present specification.

When compressing the key-value data in the storage system, the server 200 needs to generate a compression dictionary used in compression. The server 200 can extract, based on a large amount of key-value data in the storage system, a high-frequency character string, and generates a compression dictionary used in current compression, i.e. the current dictionary. FIG. 4 is a flowchart illustrating generation of a current dictionary. As shown in FIG. 4, S210 can include the following:

S211: N key-values are selected from the plurality of key-values in the storage system as training data.

The current dictionary can be obtained based on training of the key-value data in the storage system. The server 200 can extract a part of key-value data from the storage system as the training data. Specifically, the server 200 can randomly extract a plurality of pieces of key-value data from the storage system as the training data, or the server 200 can classify, based on attributive characters of the key-value data, a large amount of key-value data in the storage system, and randomly extract a plurality of pieces of key-value data from each type of key-value data as the training data. For ease of illustration, the amount of the key-value data in the training data is marked as N, wherein N is an integer greater than 1.

S213: M key-values are selected from the plurality of key-values in the storage system as verification data.

In order to prevent occurrence of sporadic data in the random extraction process of the training data, the server 200 can extract a part of key-value data from the storage system as the verification data for verifying compression efficiency of a compression dictionary obtained by training the training data. The sporadic data can occur when a large amount of key-value data has high similarity during the random extraction of the training data. The probability of occurrence of the sporadic data is relatively low. When the sporadic data occurs in the training data, the compression dictionary obtained by training the training data has higher compression efficiency for the training data, and lower compression efficiency for data other than the training data, resulting in lower overall compression efficiency for all data in the storage system. In order to prevent the occurrence of the sporadic data, the server 200 sets the verification data. The server 200 compresses the verification data by using the compression dictionary obtained by training the training data to verify the validity of the compression dictionary. For ease of description, the quantity of the key-value data in the verification data is marked as M. In order to improve the comprehensiveness of the verification data, the key-value data in the verification data does not have to coincide with the key-value data in the training data. Of course, the key-value data in the verification data can also partially coincide with the key-value data in the training data, and a coincidence degree cannot exceed a predetermined threshold. Otherwise, a verification effect of the verification data on the compression dictionary is affected. The quantity N of the key-value data in the training data can be the same as or different from the quantity M of the key-value data in the verification data.

Collection of the training data and the verification data by the server 200 can be offline collection or online collection, and is not limited in the present specification.

S215: a dictionary training parameter is set, and dictionary training is performed based on the dictionary training parameter and the training data to obtain a plurality of candidate dictionaries.

The server 200 can set a parameter for dictionary training, such as a size of the dictionary, a step-size of the training, a compression level of the training dictionary, etc. The server 200 can set a plurality of groups of dictionary training parameters. The server 200 can perform training based on the plurality of groups of dictionary training parameters and the training data to obtain the plurality of candidate dictionaries. The plurality of candidate dictionaries correspond to the plurality of groups of dictionary training parameters. Each group of dictionary training parameters corresponds to one candidate dictionary. The plurality of groups of dictionary training parameters can be set manually based on experience, or can be obtained by machine learning.

S217: a candidate dictionary with the highest compression efficiency is selected from the plurality of candidate dictionaries as the current dictionary.

In order to ensure that overall compression efficiency of the current dictionary for the plurality of key-value data in the storage system satisfies usage needs, the server 200 needs to select the candidate dictionary with the highest compression efficiency from the plurality of candidate dictionaries as the current dictionary. The server 200 can select the candidate dictionary with the highest compression efficiency as the current dictionary based on compression efficiency of each candidate dictionary in the plurality of candidate dictionaries for the training data during training. Specifically, S217 can include the following:

S217-2: the candidate dictionary with the highest compression efficiency is selected from the plurality of candidate dictionaries as a target dictionary.

Specifically, the server 200 can perform dictionary training on the training data by using each group of dictionary training parameters in the plurality of groups of dictionary training parameters step by step, and generate a candidate dictionary corresponding to a current dictionary training parameter during each time of dictionary training. The server 200 can compare the compression efficiency of the candidate dictionary corresponding to the current dictionary training parameter with the compression efficiency of the target dictionary, and use the dictionary with higher compression efficiency as the target dictionary. That is, if the compression efficiency of the candidate dictionary corresponding to the current dictionary training parameter is higher than that of the target dictionary, the compression efficiency of candidate dictionary corresponding to the current dictionary training parameter is used as the target dictionary, and if the compression efficiency of the candidate dictionary corresponding to the current dictionary training parameter is lower than that of the target dictionary, the target dictionary is kept unchanged; and the server 200 can obtain the final target dictionary when all dictionary training parameters are trained. It is worthwhile to note that before the first time of training starts, the target dictionary is null, the compression efficiency of the target dictionary is the lowest, and a ratio of a data size before compression to a data size after compression of all data stored in the storage system is 1.

The server 200 can also train the training data by using the plurality of groups of dictionary training parameters to obtain the plurality of candidate dictionaries, sort the compression efficiency of the plurality of candidate dictionaries from high to low, and select the compression dictionary corresponding to the highest compression efficiency as the target dictionary.

S217-4: the compression efficiency of the target dictionary is verified based on the verification data.

S217-6: the target dictionary is used as the current dictionary.

In order to prevent the occurrence of the sporadic data in the training data, the server 200 sets the verification data for verifying the compression efficiency of the target dictionary. Specifically, the server 200 can compress the key-value data in the verification data by using the target dictionary to obtain the compression efficiency of the target dictionary for the verification data. The server 200 can compare the compression efficiency of the target dictionary for the verification data with the compression efficiency of the target dictionary for the training data. If a difference between the compression efficiency of the target dictionary for the verification data and the compression efficiency of the target dictionary for the training data exceeds a predetermined critical value, the server 200 can determine that there is sporadic data in the training data. The server 200 extracts the training data and the verification data from the storage system again, performs dictionary training again, and generate the target dictionary. If the difference between the compression efficiency of the target dictionary for the verification data and the compression efficiency of the target dictionary for the training data does not exceed the predetermined critical value, the server 200 can determine that there is no sporadic data in the training data, and the server 200 can use the target dictionary as the current dictionary.

It is worthwhile to note that the server 200 can select a plurality of groups of training data or a plurality of groups of verification data. The server 200 can perform, based on the plurality of groups of training data and the plurality of groups of dictionary training parameters, training to generate a plurality of candidate dictionaries. Each group of dictionary training parameters corresponds to a plurality of candidate dictionaries. For the compression efficiency of the plurality of candidate dictionaries corresponding to each group of dictionary training parameters, training data corresponding to a compression dictionary with abnormal compression efficiency is deleted. The compression dictionary with abnormal compression efficiency can be the compression dictionary with the abnormal compression efficiency significantly higher or lower than that of dictionaries of other training data. The server 200 can select a candidate dictionary with the highest compression efficiency from a plurality of candidate dictionaries corresponding to remaining training data as the current dictionary. The setting of the plurality of training data can prevent the occurrence of the sporadic data, ensure the validity of the current dictionary, and improve the compression efficiency of the current dictionary for the data in the storage system.

The server 200 verifies the compression efficiency of the target dictionary by using the plurality of groups of verification data, and generates a plurality of verified compression efficiency, and each verified compression efficiency corresponds to a group of verification data. The server 200 can delete abnormal verification data from the plurality of groups of verification data. The abnormal verification data can be verification data with the verified compression efficiency significantly higher or lower than that of other verification data. The setting of the plurality of groups of verification data can prevent the occurrence of the sporadic data, ensure the validity of the current dictionary, and improve the compression efficiency of the current dictionary for the data of the storage system.

In conclusion, the data compression method P200 and system 100 based on a key-value store provided by the present specification can generate the current dictionary based on dictionary training of a large amount of data in the storage system, so the current dictionary has high applicability, and can be applied to all data in the storage system. In the conventional solution of generating the compression dictionary for data compression on the client device 300, there is a need for generating a dictionary for each piece of data, and the dictionaries corresponding to the data and compressed key-value data corresponding to the data are stored together in the storage system, resulting in additional consumption of the storage space. The method P200 and the system 100 generate a unified dictionary by analyzing the data stored in the server 200 without generating a corresponding compression dictionary for each piece of key-value data, thereby preventing additional consumption of the storage space caused by putting the dictionary in the compressed key-value data, significantly improving the compression efficiency, and still achieving a good compression effect on small data. Furthermore, because the compression dictionary is generated in advance by offline analysis, time consumption of data compression is significantly reduced compared to that of compression on the client device 300, compression time is greatly reduced, and latency is reduced. Especially for the cache storage system, because data in the cache storage system has great mobility and a lot of types, and content is relatively different, the compression dictionary generated based on the server 200 provided by the method P200 and the system 100 can be applied to all types of data in the cache storage system, thereby greatly improving the compression efficiency, and reducing the compression time.

S230: a key-value pair transmitted by the client device 300 is received.

The server 200 can perform data compression on all key-value data in the storage system by using the current dictionary after generating the current dictionary, and store the compressed data. The server 200 further can receive new key-value pair data transmitted by the client device 300, and perform data compression and storage on the new key-value pair data.

S250: data compression is performed on a key-value in the key-value pair by using the current dictionary, and the compressed key-value is stored in the storage system.

Figure 5:
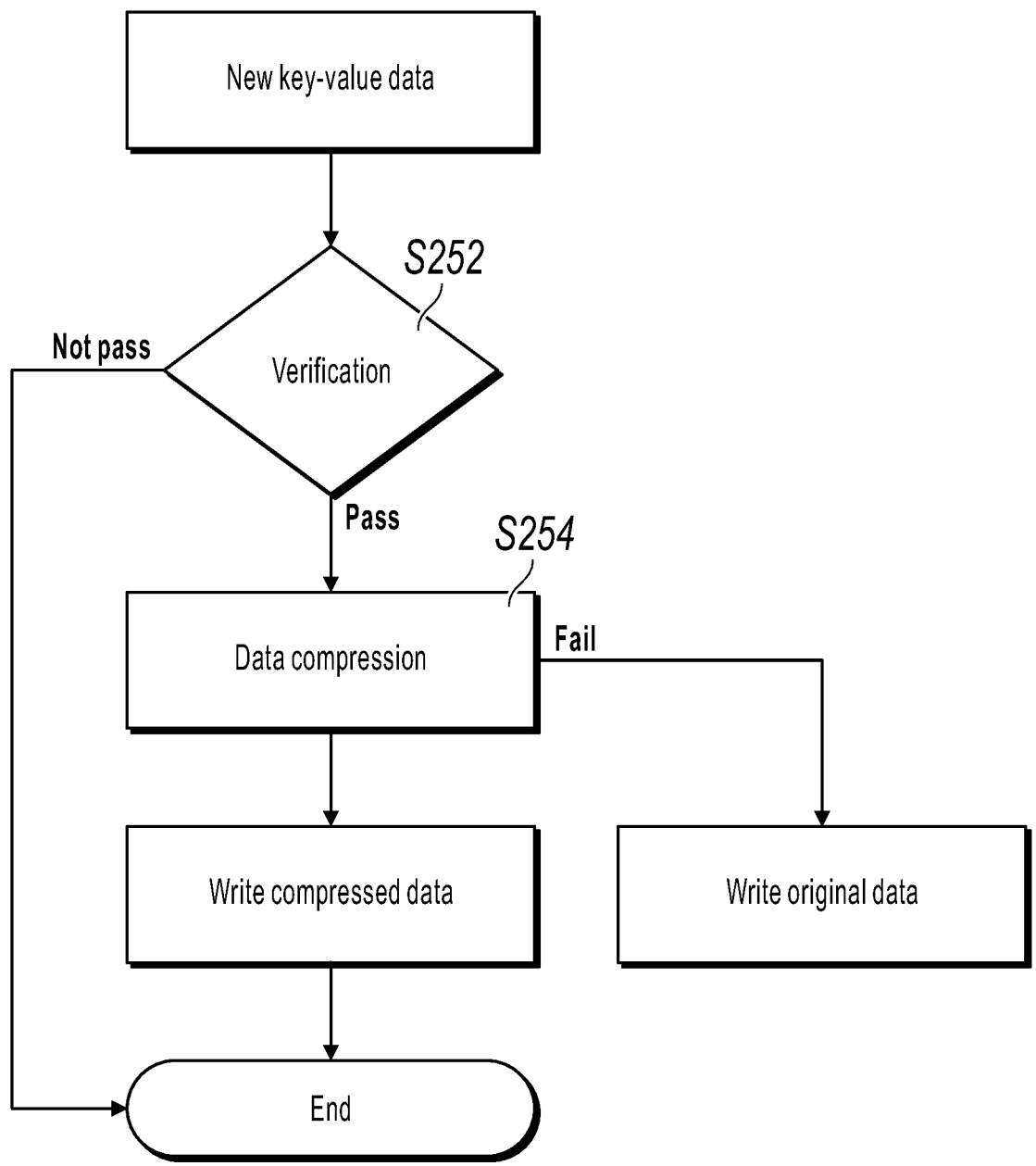
FIG. 5 is a flowchart illustrating data compression on new data, according to some embodiments of the present specification.

FIG. 5 is a flowchart illustrating data compression on new data, according to some embodiments of the present specification. As shown in FIG. 5, step S250 can include the following steps performed by the at least one processor 220 of the server 200:

S252: key-value data in the key-value pair is verified. The verification can include sensitive word verification, etc. If the key-value data passes the verification, data compression is performed on the key-value data; if the key-value data does not pass the verification, the process ends, and the key-value data is not written.

S254: data compression is performed on the key-value data by using the current dictionary. If the compression succeeds, the compressed data is written into the storage system; if the compression fails, original data of the key-value data is written into the storage system. If the key-value data does not include a character string in the current dictionary, the key-value data cannot be compressed, that is, the compression fails.

As shown in FIG. 3, the method P200 further can include the following steps performed by the at least one processor 220 of the server 200:

S270: it is determined that compression efficiency of the storage system decreases, and the current dictionary is updated.

The server 200 can monitor the compression efficiency of the current dictionary for the storage system. The compression efficiency can be the overall compression efficiency of the current dictionary for all data in the storage system. The monitoring can be real-time monitoring, periodic monitoring, monitoring performed when the data in the storage system changes, etc. When the overall compression efficiency of the current dictionary for the storage system decreases, the server 200 can automatically update the current dictionary so the compression efficiency of the current dictionary satisfies usage needs. The overall compression efficiency of the current dictionary for the storage system decreases can be that overall compression efficiency of the current dictionary for the storage system at a current moment (e.g., current time) decreases compared to overall compression efficiency at a previous moment, or can be that the overall compression efficiency of the current dictionary for the storage system is lower than a threshold of the overall compression efficiency predetermined by the server 200.

Figure 6:
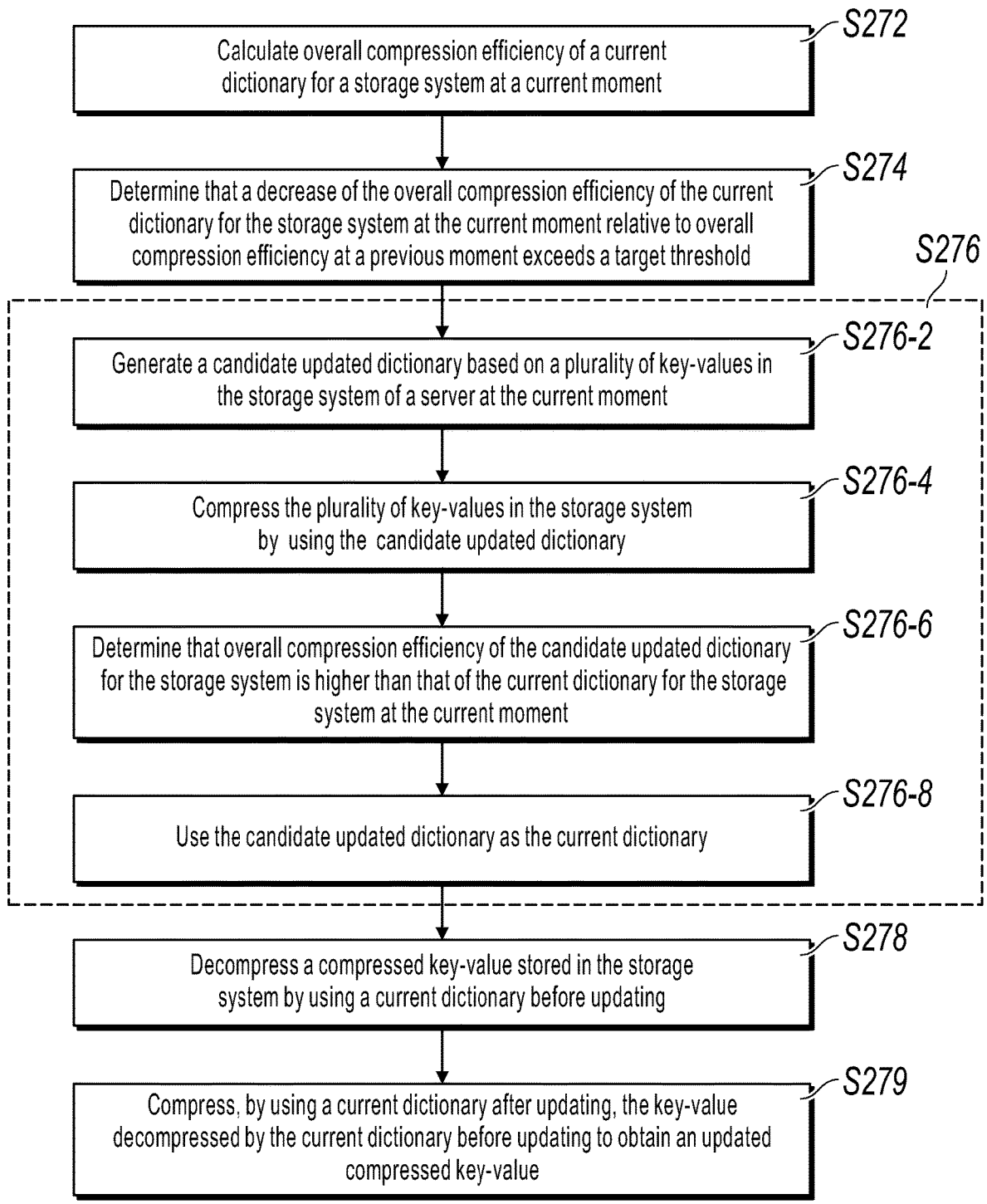
FIG. 6 is a flowchart illustrating updating of a current dictionary, according to some embodiments of the present specification.

FIG. 6 is a flowchart illustrating updating of a current dictionary, according to some embodiments of the present application As shown in FIG. 6, step S270 can include the following steps performed by the at least one processor 220 of the server 200:

S272: the overall compression efficiency of the current dictionary for the storage system at the current moment is calculated.

The server 200 can monitor the overall compression efficiency of the current dictionary for the storage system, and calculate the overall compression efficiency of the current dictionary for the storage system at the current moment.

S274: it is determined that a decrease of the overall compression efficiency of the current dictionary for the storage system at the current moment relative to the overall compression efficiency at the previous moment exceeds a target threshold.

The server 200 can compare the overall compression efficiency of the current dictionary for the storage system at the current moment with the overall compression efficiency of the current dictionary for the storage system at the previous moment. The previous moment can be a closest moment that the server 200 monitors the overall compression efficiency of the storage system before the current moment. If the decrease of the overall compression efficiency of the current dictionary for the storage system at the current moment relative to the overall compression efficiency of the current dictionary for the storage system at the previous moment exceeds the target threshold, the server 200 can determine that the overall compression efficiency of the current dictionary for the storage system decreases.

S276: the current dictionary is updated. Step S276 can include:

S276-2: a candidate updated dictionary is generated based on a plurality of key-values in the storage system of the server at the current moment.

The way of generating the candidate updated dictionary by the server 200 can be the same as the way of generating the current dictionary. That is, the server 200 can randomly extract a part of key-value data from the plurality of pieces of key-value data in the storage system at the current moment as training data, and randomly extract another part of key-value data as verification data. The extraction ways of the training data and the verification data can be the same as those in steps S211 and S213. The server 200 can set a plurality of groups of dictionary training parameters, and perform dictionary training based on the plurality of groups of dictionary training parameters and the training data, to generate a plurality of candidate dictionaries. The generation way of the candidate dictionary can be the same as that in step S215. The server 200 can select a dictionary with the highest compression efficiency from the plurality of candidate dictionaries as a target dictionary. The server 200 can verify compression efficiency of the target dictionary by using the verification data. If a difference between compression efficiency of the target dictionary for the verification data and compression efficiency of the target dictionary for the training data does not exceed a predetermined critical value, the server 200 can use the target dictionary as the candidate updated dictionary; and if the difference between the compression efficiency of the target dictionary for the verification data and the compression efficiency of the target dictionary for the training data exceeds the predetermined critical value, the server 200 extracts the training data and the verification data from the storage system again, and performs dictionary training again to generate the target dictionary.

S276-4: the plurality of key-values in the storage system are compressed by using the candidate updated dictionary.

After generating the candidate updated dictionary, the server 200 compresses the plurality of pieces of key-value data in the storage system by using the candidate updated dictionary to obtain overall compression efficiency of the candidate updated dictionary for the storage system at the current moment.

S276-6: it is determined that the overall compression efficiency of the candidate updated dictionary for the storage system is higher than the overall compression efficiency of the current dictionary for the storage system at the current moment.

S276-8: the candidate updated dictionary is used as the current dictionary.

The server 200 can compare the overall compression efficiency of the candidate updated dictionary for the storage system at the current moment with the overall compression efficiency of the current dictionary for the storage system at the current moment. If the overall compression efficiency of the candidate updated dictionary for the storage system at the current moment is higher than the overall compression efficiency of the current dictionary for the storage system at the current moment, or an increase of the overall compression efficiency of the candidate updated dictionary for the storage system at the current moment relative to the overall compression efficiency of the current dictionary for the storage system at the current moment exceeds a predetermined threshold, or the overall compression efficiency of the candidate updated dictionary for the storage system at the current moment is higher than the overall compression efficiency of the current dictionary for the storage system at the current moment, and is higher than an overall compression efficiency threshold predetermined by the server 200, the server 200 can replace the current dictionary with the candidate updated dictionary; otherwise, the server 200 extracts training data and verification data from the plurality of pieces of key-value data in the storage system again, and generates the candidate updated dictionary again.

As shown in FIG. 6, step S270 can further include the following steps performed by the at least one processor 220 of the server 200:

S278: a compressed key-value stored in the storage system is decompressed by using a current dictionary before updating.

S279: the key-value decompressed by using the current dictionary before updating is compressed by using a current dictionary after updating to obtain an updated compressed key-value.

After the current dictionary is updated, in order to reduce the space of the key-value data in the storage system, the server 200 can replace the data of the key-value data in the storage system compressed by using the current dictionary before updating with the data compressed by using the current dictionary after updating. Specifically, the server 200 firstly decompresses the compressed key-value data by using the current dictionary before updating, and then compresses the decompressed data again by using the current dictionary after updating. Before all compressed key-value data in the storage system is replaced with the data compressed by using the current dictionary after updating, the storage system can retain the current dictionary before updating. If the client device 300 transmits a reading request to the server 200 before all compressed key-value data in the storage system is replaced with the data compressed by using the current dictionary after updating, the server 200 can first analyze a key-value required to be read by the client device 300, determine whether a compression dictionary used by compressed key-value data corresponding to the key-value is the current dictionary before updating or the current dictionary after updating, and then decompress the compressed key-value data corresponding to the key-value by using the correct compression dictionary to obtain the key-value to be read by the client device 300.

In conclusion, the data compression method P200 and system 100 based on a key-value store provided by the present specification can monitor the overall compression efficiency of the data in the storage system. If the overall compression efficiency of the data in the storage system decreases, the server 200 can identify the decrease in time, and update the current dictionary immediately, so the overall compression efficiency of the updated current dictionary for the data in the storage system is recovered or even higher than before to satisfy usage needs, and the storage space occupied by the data is further reduced. Therefore, the data compression method P200 and system 100 based on a key-value store provided by the present specification can improve the overall compression efficiency of the storage system, reduce the storage space occupied by the data, reduce a data storage cost, and reduce time consumption of data compression.

As shown in FIG. 3, the method P200 further can include the following steps performed by the at least one processor 220 of the server 200:

S290: a target key-value in the storage system is read.

The server 200 may not only receive new key-value pair data transmitted by the client device 300, compress and store key-value data in the new key-value pair in the storage system, and can also receive a reading request for key-value data transmitted by the client device 300, read compressed key-value data corresponding to key-value data required to be read by the client device 300 in the storage system, and decompress the compressed key-value data by using a corresponding compression dictionary to obtain the key-value data required to be read by the client device 300. For ease of description, the client device that transmits the reading request for key-value data is marked as a target client device, the client device 300 includes the target client device; the key-value data required to be read by the target client device is marked as a target key-value, and the plurality of key-values in the storage system include the target key-value.

FIG. 7 is a flowchart illustrating data reading, according to some embodiments of the present specification. As shown in FIG. 7, step S290 can include:

S292: the reading request for the target key-value transmitted by the target client device is received.

After receiving the reading request for the target key-value transmitted by the target client device, the server 200 first needs to analyze the target key-value data, and determines whether the target key-value data is compressed; if the target key-value data is not compressed, the server 200 transmits original data corresponding to the target key-value data to the target client device; and if the target key-value data is compressed and stored in the storage system, the server 200 needs to decompress compressed key-value data of the target key-value.

S294: the compressed key-value of the target key-value is decompressed by using the current dictionary to obtain the target key-value.

S296: the target key-value is transmitted to the target client device.

The server 200 needs to decompress the compressed key-value data of the target key-value after determining that the key-value is compressed key-value data. Specifically, the server 200 can obtain the compressed key-value data corresponding to the target key-value data in the storage system; the server 200 can decompress the compressed key-value data by using the current dictionary used in the compression of the key-value data; the server 200 transmits the decompressed key-value data to the target client device after successfully decompressing the compressed key-value data; and if the decompression of the compressed key-value data fails, the server 200 transmits null information and prompt information for data reading failure to the target client device.

In conclusion, the data compression method P200 and system 100 based on a key-value store provided by the present specification can generate the current dictionary based on dictionary training of a large amount of data in the storage system, so the current dictionary has high applicability, and can be applied to all data in the storage system. In the conventional solution of generating the compression dictionary for data compression on the client device 300, there is a need for generating a dictionary for each piece of data, and the dictionaries corresponding to the data and compressed key-value data corresponding to the data are stored together in the storage system, resulting in additional consumption of the storage space. The method P200 and the system 100 generate a unified dictionary by analyzing the data stored in the server 200 without generating a corresponding compression dictionary for each piece of key-value data, thereby preventing additional consumption of the storage space caused by putting the dictionary in the compressed key-value data, significantly improving the compression efficiency, and achieving a good compression effect on small data. Furthermore, because the compression dictionary is generated in advance by offline analysis, time consumption of data compression is significantly reduced compared to that of compression on the client device 300, compression time is greatly reduced, and latency is reduced. Especially for the cache storage system, because data in the cache storage system has great mobility and a lot of types, and content is relatively different, the compression dictionary generated based on the server 200 provided by the method P200 and the system 100 can be applied to all types of data in the cache storage system, thereby greatly improving the compression efficiency, and reducing the compression time. Furthermore, the method P200 and the system 100 can monitor the overall compression efficiency of all data in the storage system, if the overall compression efficiency of the data in the storage system decreases, the server 200 can identify the decrease in time, and update the current dictionary immediately, so the overall compression efficiency of the updated current dictionary for the data in the storage system is recovered or even higher than before to satisfy usage needs, and the storage space occupied by the data is further reduced. Therefore, the data compression method P200 and system 100 based on a key-value store provided by the present specification can improve the overall compression efficiency of the storage system, reduce the storage space occupied by the data, reduce a data storage cost, and reduce time consumption of data compression.

Another aspect of the present specification provides a non-transient storage medium that stores at least one set of executable instructions used for data compression based on a key-value store, and when executed by a processor, the executable instructions instruct the processor to implement the steps of the data compression method P200 based on a key-value store according to the present specification. In some possible implementations, various aspects of the present specification can be implemented in the form of a program product that includes a program code. When the program product runs on the server 200, the program code is used to enable the server 200 to perform the steps of the data compression methods based on a key-value store described in the present specification. The program product used for implementing the previous method can adopt a portable compact disk read-only memory (CD-ROM) including the program code, and can run on the server 200. However, the program product of the present specification is not limited to that; in the present specification, the readable storage medium can be any tangible medium that includes or stores a program that can be used by or used together with an instruction execution system (such as the processor 220). The program product can adopt one or any combination of more readable media. The readable medium can be a readable signal medium or readable storage medium. The readable storage medium can be but is not limited to, for example, an electronic, magnetic, optical, electromagnetic, infrared, or semi-conductor system, apparatus or device, or any combination of these media. More specific examples of the readable storage medium include: an electric connection having one or more wires, a portable disk, a hard disk, a random access memory (RAM), a read-only memory (ROM), a erasable programmable read-only memory (EPROM or a flash memory), an optical fiber, a portable compact disk read-only memory (CD-ROM), an optical storage device, a magnetic storage device, or any suitable combination of these media. The computer readable storage medium can include a data signal in a base band or propagated as a part of a carrier wave, and the data signal carries a readable program code. The propagated data signal can be in a plurality of forms, includes but is not limited to an electromagnetic signal, an optical signal or any combination of these signals. The readable storage medium can further be any readable medium other than the readable storage medium, and the readable medium can transmit, propagate or transfer a program used by or used together with an instruction execution system, apparatus or device. The program code included in the readable storage medium can be transferred by any suitable medium that includes but is not limited to wireless, wired, optical cable, RF, etc., or any suitable combination of these media. One or any combination of more programming languages can be used to write the program code for implementing the operations of the present specification, the programming languages include object-oriented programming languages such as Java and C++, and further include conventional procedural programming languages such as C language or similar programming languages. The program code can be completely executed on the server 200, partially executed on the server 200, executed as an independent software package, partially executed on the server 200 and partially executed on a remote computing device, or completely executed on the remote computing device or a server (the server 200). When the remote computing device is involved, the remote computing device can be connected to the server 200 via the network 120, or can be connected to an external computing device.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

To sum up, after reading the detailed disclosure, those skilled in the art can understand that the previous detailed disclosure can be presented by way of example only, and does not have to be restrictive. Although there is no clear description here, those skilled in the art can understand that the present specification includes various reasonable changes, improvements and modifications to the embodiments. These changes, improvements and modifications are proposed based on the present specification, and fall within the spirit and scope of the example embodiments of the present specification.

Furthermore, certain terms in the present specification have been used to describe the embodiments of the present specification. For example, "one embodiment", "an embodiment" and/or "some embodiments" mean that specific characteristics, structures or features described in conjunction with the embodiment can be included in at least one embodiment of the present application. Hence, it can be emphasized and should be understood that two or more references to "an embodiment" or "one embodiment" or "alternative embodiment" in various parts of the present specification do not necessarily all refer to the same embodiment. In addition, the specific characteristics, structures or features can be appropriately combined in one or more embodiments of the present specification.

It should be understood that in the previous description of the embodiments of the present specification, in order to help understand one feature, for the purpose of simplifying the present specification, the present specification combines various features into a single embodiment, drawing, or a description of the embodiment or drawing. However, it does not mean that the combination of these features is necessary. It is entirely possible for those skilled in the art to extract some of the features as a separate embodiment when reading the present specification. That is, the embodiments in the present specification can also be understood as an integration of a plurality of sub-embodiments. It is also logical when the content of each sub-embodiment is less than all the features of a single previous disclosed embodiment.

Each patent, patent application, patent application publication and other materials cited here, such as articles, books, descriptions, publications, documents, materials, can be incorporated here by reference. In the entire contents used for all purposes, except for any related litigation document history, any identical litigation document history that may be inconsistent or conflicting with this document, or any identical litigation document history that may have restrictive influence on the widest scope of the claims, are associated with this document now or in the future. For example, if there is any inconsistency or conflict between the description, definition and/or use of the terms associated with any material included and the description, definition and/or use of the terms related to this document, the terms in this document shall prevail.

Finally, it should be understood that the implementations of the application disclosed here are illustrative of the principles of the implementations of the present specification.

Other modified embodiments are also within the scope of the present specification. Therefore, the embodiments disclosed in the present specification are to be considered as illustrative and not restrictive. Those skilled in the art can implement the application in the present specification by use of alternative configurations based on the embodiments of the present specification. Therefore, the embodiments of the present specification are not limited to those accurately described embodiments in the application.

What is claimed is:

1. A method implemented in a one or more computers, the method comprising:
generating, at a server, a current dictionary based on a plurality of key-value pairs stored in a storage system of the server;
receiving one or more key-value pairs transmitted by client devices; and for each received key-value pair:
performing, at the server, data compression on the received key-value pair by using the current dictionary to obtain a compressed key-value pair; and
storing the compressed key-value pair in the storage system of the server;
determining whether a compression efficiency of the storage system decreases; and
in response to determining that the compression efficiency of the storage system decreases, updating the current dictionary by performing dictionary training, wherein the updating the current dictionary comprises:
selecting N key-value pairs and M key-value pairs from the plurality of key-value pairs in the storage system, wherein N is an integer greater than 1 and M is an integer greater than 1, the N key-value pairs comprises a first training data set and the M Key-value pairs comprises a first verification data set, and the first training data set and the first verification data set are different;
setting a plurality of groups of dictionary training parameters;
performing dictionary training for a plurality of candidate dictionaries respectively based on the plurality of groups of dictionary training parameters and the first training data set;
selecting a candidate dictionary with a highest compression efficiency based on the first training data set from the plurality of candidate dictionaries as a target dictionary;
obtaining a compression efficiency of the target dictionary based on the first verification data set, wherein the compression efficiency of the target dictionary based on the first verification data set is determined by compressing the first verification data set using the target dictionary;
determining whether a difference between the compression efficiency of the target dictionary based on the first training data set and the compression efficiency of the target dictionary based on the first verification data set exceeds a predetermined threshold; and
in response to determining that the difference does not exceed the predetermined threshold, setting the target dictionary as the current dictionary.

2. The method of claim 1, wherein the storage system comprises a cache storage system.

3. The method of claim 1, wherein, when the difference between the compression efficiency of the target dictionary based on the first training data set and the compression efficiency of the target dictionary based on the first verification data set exceeds the predetermined threshold:
extracting, at the server, a second training data set and a second verification data set; and
updating the current dictionary by performing dictionary training based on the plurality of groups of dictionary training parameters, the second training data set and the second verification data set, wherein the second training data set comprises N1 key-value pairs, the second verification data set comprise M1 key-value pairs, N1 is an integer greater than 1, M1 is an integer greater than 1, wherein the second training data set is different to the first training data set, and the second verification data set is different to the first verification data set, and wherein the second training data set and the second verification data set are different.

4. The method of claim 1, wherein M is equal to N.

5. The method of claim 1, wherein determining that the compression efficiency of the storage system decreases, and updating the current dictionary, comprises:
calculating overall compression efficiency of the current dictionary for the storage system at a current moment;
determining that a decrease of the overall compression efficiency of the current dictionary for the storage system at the current moment relative to overall compression efficiency of the current dictionary at a previous moment exceeds a target threshold; and
updating the current dictionary in response to the determination of the decrease.

6. The method of claim 5, wherein the determining that the compression efficiency of the storage system decreases, and updating the current dictionary, comprises:
decompressing a compressed key-value pair stored in the storage system by using a current dictionary before updating; and
compressing, by using a current dictionary after updating, a key-value pair decompressed by the current dictionary before updating to obtain an updated compressed key-value pair.

7. The method of claim 1, further comprising:
reading a target key-value pair in the storage system.

8. The method of claim 7, wherein the reading a target key-value pair in the storage system comprises:
receiving a reading request for the target key-value pair transmitted by a target client device, wherein the client devices comprise the target client device, and the plurality of key-value pairs comprise the target key-value pair;
decompressing a compressed key-value pair corresponding to the target key-value pair by using the current dictionary to obtain the target key-value pair; and
transmitting the target key-value pair to the target client device.

9. A computer-implemented system, comprising:
one or more computers realizing a server; and
one or more computer memory devices interoperably coupled with the one or more computers and having non-transitory computer-readable storage media storing one or more instructions that, when executed by the one or more computers, perform one or more operations comprising:
generating, at the server, a current dictionary based on a plurality of key-value pairs stored in a storage system of the server;
receiving one or more key-value pairs transmitted by client devices; and
for each received key-value pair:

performing, at the server, data compression on the received key-value pair by using the current dictionary to obtain a compressed key-value pair; and storing the compressed key-value pair in the storage system of the server;

determining whether a compression efficiency of the storage system decreases; and in response to determining that the compression efficiency of the storage system decreases, updating the current dictionary by performing dictionary training, wherein the updating the current dictionary comprises:

selecting N key-value pairs and M key-value pairs from the plurality of key-value pairs in the storage system, wherein N is an integer greater than 1 and M is an integer greater than 1, the N key-value pairs comprises a first training data set and the M Key-value pairs comprises a first verification data set, and the first training data set and the first verification data set are different;

setting a plurality of groups of dictionary training parameters;

performing dictionary training for a plurality of candidate dictionaries respectively based on the plurality of groups of dictionary training parameters and the first training data set;

selecting a candidate dictionary with a highest compression efficiency based on the first training data set from the plurality of candidate dictionaries as a target dictionary;

obtaining a compression efficiency of the target dictionary based on the first verification data set, wherein the compression efficiency of the target dictionary based on the first verification data set is determined by compressing the first verification data set using the target dictionary;

determining whether a difference between the compression efficiency of the target dictionary based on the first training data set and the compression efficiency of the target dictionary based on the first verification data set exceeds a predetermined threshold; and in response to determining that the difference does not exceed the predetermined threshold, setting the target dictionary as the current dictionary.

10. The computer-implemented system of claim 9, wherein the storage system comprises a cache storage system.

11. The computer-implemented system of claim 9, wherein, when the difference between the compression efficiency of the target dictionary based on the first training data set and the compression efficiency of the target dictionary based on the first verification data set exceeds the predetermined threshold, the one or more operations comprise:

extracting, at the server, a second training data set and a second verification data set; and updating the current dictionary by performing dictionary training based on the plurality of groups of dictionary training parameters, the second training data set and the second verification data set, wherein the second training data set comprises N1 key-value pairs, the second verification data set comprise M1 key-value pairs, N1 is an integer greater than 1, M1 is an integer greater than 1, wherein the second training data set is different to the first training data set, and the second verification data set is different to the first verification data set, and wherein the second training data set and the second verification data set are different.

12. The computer-implemented system of claim 9, wherein M is equal to N.

13. The computer-implemented system of claim 9, wherein the determining that the compression efficiency of the storage system decreases, and updating the current dictionary, comprises:

calculating overall compression efficiency of the current dictionary for the storage system at a current moment;

determining that a decrease of the overall compression efficiency of the current dictionary for the storage system at the current moment relative to overall compression efficiency of the current dictionary at a previous moment exceeds a target threshold; and updating the current dictionary in response to the determination of the decrease.

14. A non-transitory computer-readable storage medium storing one or more instructions executable by a computer system to perform operations, comprising:

generating, at a server, a current dictionary based on a plurality of key-value pairs stored in a storage system of the server;

receiving one or more key-value pairs transmitted by client devices; and for each received key-value pair:
performing, at the server, data compression on the received key-value pair by using the current dictionary to obtain a compressed key-value pair; and storing the compressed key-value pair in the storage system of the server;

determining whether a compression efficiency of the storage system decreases; and in response to determining that the compression efficiency of the storage system decreases, updating the current dictionary by performing dictionary training, wherein the updating the current dictionary comprises:

selecting N key-value pairs and M key-value pairs from the plurality of key-value pairs in the storage system, wherein N is an integer greater than 1 and M is an integer greater than 1, the N key-value pairs comprises a first training data set and the M Key-value pairs comprises a first verification data set, and the first training data set and the first verification data set are different;

setting a plurality of groups of dictionary training parameters;

performing dictionary training for a plurality of candidate dictionaries respectively based on the plurality of groups of dictionary training parameters and the first training data set;

selecting a candidate dictionary with a highest compression efficiency based on the first training data set from the plurality of candidate dictionaries as a target dictionary;

obtaining a compression efficiency of the target dictionary based on the first verification data set, wherein the compression efficiency of the target dictionary based on the first verification data set is determined by compressing the first verification data set using the target dictionary;

determining whether a difference between the compression efficiency of the target dictionary based on the first training data set and the compression efficiency of the target dictionary based on the first verification data set exceeds a predetermined threshold; and in response to determining that the difference does not exceed the predetermined threshold, setting the target dictionary as the current dictionary.

\* \* \* \* \*